United States Patent
Basore et al.

(10) Patent No.: US 9,351,142 B2
(45) Date of Patent: *May 24, 2016

(54) TEXT MESSAGE GENERATION FOR EMERGENCY SERVICES AS A BACKUP TO VOICE COMMUNICATIONS

(71) Applicant: AT&T INTELLECTUAL PROPERTY I, LP, Atlanta, GA (US)

(72) Inventors: David L. Basore, Little Silver, NJ (US); John Jutten Lawser, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,048

(22) Filed: Sep. 5, 2014

(65) Prior Publication Data

US 2014/0370840 A1 Dec. 18, 2014

Related U.S. Application Data

(63) Continuation of application No. 13/689,396, filed on Nov. 29, 2012, now Pat. No. 8,874,070.

(51) Int. Cl.
*H04W 4/22* (2009.01)
*H04W 4/12* (2009.01)

(52) U.S. Cl.
CPC . *H04W 4/22* (2013.01); *H04W 4/12* (2013.01)

(58) Field of Classification Search
CPC ....... H04W 76/007; H04W 4/22; H04W 4/12; H04W 4/16; H04W 4/18; H04W 4/185; H04W 4/20; H04M 11/04; H04M 2/42042; H04M 1/72536

USPC .......... 455/404.1, 404.2, 412.2, 552.1, 553.1, 455/556.2

See application file for complete search history.

(56) References Cited

U.S. PATENT DOCUMENTS

| | | |
|---|---|---|
| 6,456,695 B2 | 9/2002 | Lee |
| 6,775,356 B2 | 8/2004 | Salvucci et al. |
| 8,190,179 B2 | 5/2012 | Hwang |
| 8,369,488 B2 | 2/2013 | Sennett et al. |
| 8,611,934 B2 | 12/2013 | Kuulusa et al. |
| 8,666,358 B2 | 3/2014 | Qu et al. |
| 2010/0003954 A1 | 1/2010 | Greene et al. |
| 2010/0296642 A1 | 11/2010 | Hidajat |
| 2010/0323728 A1 | 12/2010 | Gould et al. |
| 2011/0281567 A1 | 11/2011 | Moliner et al. |
| 2012/0149324 A1 | 6/2012 | Daly |
| 2012/0164968 A1 | 6/2012 | Velusamy et al. |
| 2012/0302269 A1 | 11/2012 | Gould et al. |
| 2013/0109340 A1 | 5/2013 | Williams et al. |
| 2013/0109344 A1 | 5/2013 | Ung |
| 2013/0203373 A1 | 8/2013 | Edge |
| 2013/0229948 A1 | 9/2013 | Stewart |

*Primary Examiner* — Magdi Elhag
(74) *Attorney, Agent, or Firm* — Baker & Hostetler LLP

(57) ABSTRACT

A mobile device may detect when a calling party dials an emergency service to request emergency assistance. Following input of the dialed digits, the device may automatically generate a text message in addition to initiating a voice call, both of which may be transmitted over a wireless data network. The wireless network may correlate the two calls as originating from the same emergency situation and may attempt to deliver the two calls to a Public Services Answering Position (PSAP) at an appropriate emergency center. If the PSAP does not receive a voice call, the PSAP may communicate with the device via test messaging.

20 Claims, 8 Drawing Sheets

TEXT MESSAGE GENERATION FOR EMERGENCY SERVICES AS A BACKUP TO VOICE COMMUNICATIONS

CROSS REFERENCE TO RELATED APPLICATIONS

The instant application is a continuation of, and claims priority to, U.S. patent application Ser. No. 13/689,396, filed Nov. 29, 2012. U.S. patent application Ser. No. 13/689,396 is incorporated by reference herein in its entirety.

TECHNICAL FIELD

The technical field generally relates to wireless communications, and more specifically relates to text messaging and emergency voice calls, and even more specifically relates to text message backup for emergency voice calls.

BACKGROUND

Mobile devices, such as mobile phones, for example, may be used as a link to emergency services. In isolated or rural areas, a mobile phone may be the only link to emergency services. Many factors may influence the ability to make an emergency call. For example, battery power of a mobile phone may be low, the propagation path between a cellular tower and a mobile phone may have poor propagation characteristics, and/or obstructions may exist in a propagation path. Such factors may prevent a call for emergency services.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

A text message for emergency services may be generated as a backup to an emergency voice call (e.g., a 911 voice call). For example, when a user of a mobile device dials 9-1-1 to request emergency assistance, the device may automatically generate a text message in addition to initiating a voice call. In various example embodiments, the text message may be generated when the device in not able to initiate and/or establish the voice call. For example insufficient signal strength may prevent the device from initiating and/or establishing a voice call. Insufficient signal strength may be a result of any appropriate factor or factors, such as, for example, battery power of the device may be low, a propagation path between a cellular tower and the device may have poor propagation characteristics, and/or an obstruction or obstructions may exist in a propagation path.

In an example embodiment, if a voice call cannot be initiated and/or established, a text message may be sent instead of the voice call. In another example embodiment, a text message and a voice call may be sent concurrently.

For example, the device may be capable of determining when an emergency call is being initiated (e.g., dialing 9-1-1). Upon determining that the emergency call is being initiated (e.g., detection of dialed digits), the device may automatically generate a text message. The text message may be generated in addition to the voice call. The text message and the voice call may be transmitted over a wireless data network. The wireless network may correlate the text message and the voice call as originating from the same emergency situation and deliver them to an appropriate Public Services Answering Position (PSAP) in an appropriate emergency center. If the voice call is received by the emergency center, a voice conversation may ensue. If no voice call is received at the emergency center, a text messaging session may ensue.

BRIEF DESCRIPTION OF THE DRAWINGS

Reference is made here to the accompanying drawings, which are not necessarily drawn to scale.

DETAILED DESCRIPTION OF ILLUSTRATIVE EMBODIMENTS

Aspects of the instant disclosure are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

For many people, mobile devices, such as mobile phones for example, may be more than a mere vehicle for communication. The devices may serve as a lifeline to emergency services. This especially may be true in isolated or rural areas. Signal strength, however, may be insufficient to initiate, establish, and/or maintain a voice connection. This may become critical in emergency situations, for example, wherein an individual may be trying to contact a 911 emergency center for assistance.

A complete lack of signal may prevent a device from sending and/or receiving both voice and text messages. It may be possible however, to send a text message when conditions prevent sending and/or receiving voice messages. And it may be possible to maintain a text messaging session when a voice session may be dropped. This may be due to a text message requiring less bandwidth than a voice session, text message termination after the message is sent, or any appropriate combination thereof. Thus, for example, if a connection is intermittent, a text message may be able to be sent to its intended recipient, and a voice call may be interrupted and/or dropped.

Therefore, it may be advantageous for a mobile device to automatically generate a text message associated with every 911 call attempt and for the telecommunications network to correlate both forms of communication from call origination to the terminating emergency center. In cases where the voice call is successful, the text message can be discarded. However, in those cases where the voice call is unsuccessful due to insufficient signal strength, the text message can provide a channel of communication between the caller and the emergency center. In some cases the caller might not be aware that a text message was sent and received; however, information on location could be used by authorities for further investigation. In some cases, this could be a matter of life or death.

Figure 1:
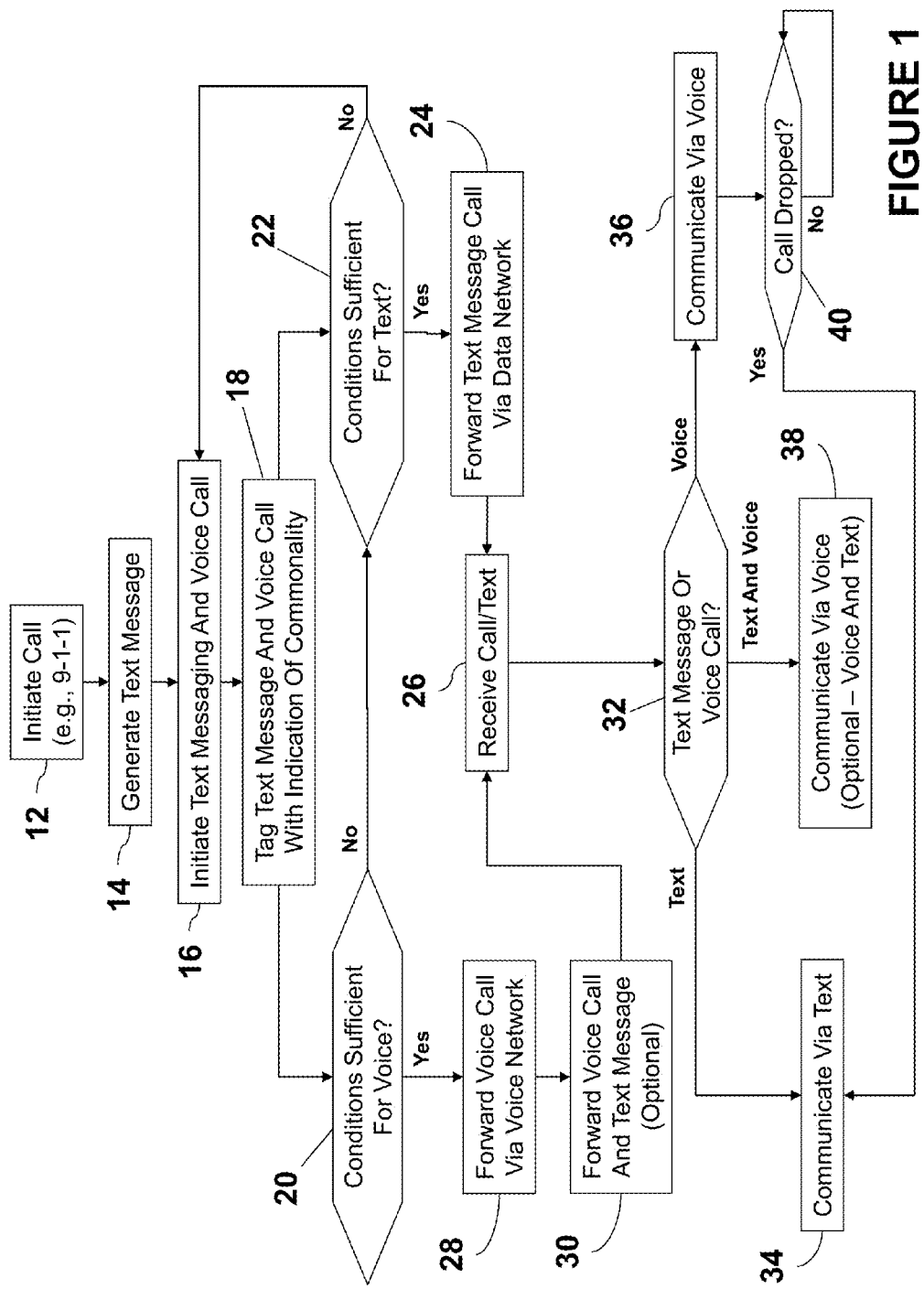
FIG. 1 is a flow diagram of an example process for text message generation for emergency services as a backup to voice communications.

FIG. 1 is a flow diagram of an example process for text message generation for emergency services as a backup to voice communications. A call may be initiated at step 12. The call may be, for example, a call for emergency services, a 9-1-1 call, a call to a relative, or any appropriate call. A text message may be generated at step 14. In an example embodiment, the text message may be automatically generated. The text message may be automatically generated when the call is initiated. In an example embodiment, the text message may be automatically generated when it is determined that the call is of a predetermined type or class, such as, for example, an emergency call. An emergency call may comprise a 9-1-1 call (e.g., called number is 9-1-1), a call to a predetermined number, a call to a number that is determined to be related to an emergency call, or the like, or any appropriate combination thereof. Predetermined numbers may comprise, for example, a list of predetermined phone numbers such as a phone number of a fire department, a phone number of an ambulance, a phone number of a police station, a phone number of a hospital, a phone number of a relative (e.g., parent, child, etc.), or the like. In an example embodiment, when the call is initiated, at step 12, the list of predetermined numbers may be compared to the number being called, and if a match exists, it may be determined that the call is an emergency call.

In an example embodiment, when the call is initiated (at step 12), the number being called may be used to query a database, a search engine, memory, or the like to determine if the number is associated with an emergency call. For example, the number may be used to search a directory to determine to whom the number is assigned. If the number is assigned to a hospital, a police station, an ambulance service, etc., the call may be determined to be an emergency call.

The text message may comprise any appropriate message. The text message may be predetermined, generated dynamically when the call is initiated, or any appropriate combination thereof. For example, the text message may comprise a predetermined message such as, for example, "Help," "Need Assistance," etc. The predetermined text message may include the name of the person sending the message. The name of the person may be obtained, for example, from profile information stored on a mobile device from which the text message is being generated, the mobile device may be programmed to store a subscriber's name, for incorporation into the text message, or any appropriate combination thereof. Accordingly, the predetermined message may comprise a message such as, for example, "Help, my name is Joe Smith," "Need Assistance, my name is Joe Smith" etc.

The text message may comprise information that is determined dynamically as triggered by initiation of the call. For example, the text message may comprise location information, time, etc. In an example embodiment, the text message may comprise a current location of the mobile device generating the text message, the most recent known location of the mobile device generating the text message, or the like, or any appropriate combination thereof. The text message may comprise a time at which the text message is being generated. Location information may be formatted in any appropriate manner, such as, for example, latitude, longitude, map coordinates, addresses, etc. In an example embodiment, location information may be formatted in accordance with geographic code references such as the Federal Information Processing Standard (FIPS), ZIP codes, and/or the National Weather Service Specific Area Message Encoder (SAME) codes, Geographic Information System (GIS) Alert Mapping Service, or the like, or any appropriate combination thereof.

In an example embodiment, when the call is initiated (at step 12), a prompt may be rendered on the mobile device from which the call is being initiated. The prompt may be provided in any appropriate manner, such as, for example, visually, audibly, mechanically (e.g., vibration), or the like, or any appropriate combination thereof. The prompt may indicate that a user of the mobile device should speak into the device. The prompt may indicate that the user should speak his/her name, location, and/or nature of the emergency. For example, upon determining that the call is an emergency call, a message may be displayed on the mobile device indicating that the user should say his/her name, location, and nature of the emergency. The audio information spoken by the user may be converted into text. The converted text may be incorporated into the text message generated at step 14.

Text messaging may be initiated and a voice call may be initiated at step 16. Text messaging and the voice call may be initiated in any appropriate manner, such as, for example, a text messaging session and a voice call session may be initiated via communication with an appropriate entity of a network. As described in more detail herein, the network may comprise any appropriate communications network and the entity (or entities) may comprise any appropriate entity (or entities) of the communications network.

At step 18, the text messaging session and the voice call session may be marked, or tagged, to indicate commonality. The text messaging session and the voice call session may be marked, or tagged, in any appropriate manner. For example, information in each of the text messaging session and the voice call session may be formatted to include an indication of the mobile device from which the sessions are being established, an indication of a subscriber associated with the mobile device, an identification number indicated that the text messaging session and the voice call session are correlated or paired, or the like, or any appropriate combination thereof.

It may be determined if conditions are sufficient to establish and/or maintain a voice call at step 20. Conditions, or factors, to be considered may include signal strength, battery power of the mobile device, propagation characteristics, obstructions, or the like, or any appropriate combination thereof. In an example embodiment, a signal received by the mobile device may be analyzed (e.g., signal strength, power, voltage, current, etc.). If it is determined that the received signal strength is less than a threshold value, it may be determined that conditions are not sufficient to establish and/or maintain a voice call session. If it is determined that the received signal strength is equal to or greater than a threshold value, it may be determined that conditions are sufficient to establish and/or maintain a voice call session. The threshold value may comprise any appropriate value, such as, for example, a value of power, a value of voltage, a value of current, a percentage value of power, a percentage value of voltage, a percentage value of current, or the like, or any appropriate combination thereof. In an example embodiment, the mobile device may measure signal strength and may adjust power as needed to support communications.

If is determined, at step 20, that conditions are not sufficient to establish and/or maintain a voice call session, it may be determined at step 22 if conditions are sufficient for text messaging at step 22. Conditions, or factors, to be considered may include signal strength, battery power of the mobile device, propagation characteristics, obstructions, or the like, or any appropriate combination thereof. In an example embodiment, signal strength (e.g., power, voltage, current, etc.) of a signal received by the mobile device may be analyzed. If it is determined that the received signal strength is less than a threshold value, it may be determined that conditions are not sufficient to establish and/or maintain a text call session. If it is determined that the received signal strength is equal to or greater than a threshold value, it may be determined that conditions are sufficient to establish and/or maintain a text call session. The threshold value may comprise any appropriate value, such as, for example, a value of power, a value of voltage, a value of current, a percentage value of power, a percentage value of voltage, a percentage value of current, or the like, or any appropriate combination thereof.

If is determined, at step 22, that conditions are not sufficient to establish and/or maintain a text messaging session, the process may proceed to step 16 to try again.

If is determined, at step 20, that conditions are sufficient to establish and/or maintain a voice call session, the voice call may be forwarded at step 28. The voice call may be forwarded via any appropriate network, such as, for example, a voice network, a network capable of communicating voice, or any appropriate combination thereof. Optionally, if is determined, at step 20, that conditions are sufficient to establish and/or maintain a voice call session, the voice call and the text message may be forwarded at step 30. The voice call may be forwarded via any appropriate network and the text message may be forwarded via any appropriate network. For example, the voice call may be forwarded via a voice network, a network capable of communicating voice, or any appropriate combination thereof. The text message may be forwarded via a data network, a network capable of communicating data, a network capable of communicating text, or any appropriate combination thereof. In an example embodiment, the text message may be forwarded via a network capable of communications via the short messaging service (SMS) system.

If is determined, at step 22, that conditions are sufficient to establish and/or maintain a text messaging session, the text message may be forwarded at step 24. The text message may be forwarded via any appropriate network, such as, for example, a data network, a network capable of communicating text, or any appropriate combination thereof. The text message may be forwarded via a data network, a network capable of communicating data, a network capable of communicating text, or any appropriate combination thereof. In an example embodiment, the text message may be forwarded via a network capable of communications via the short messaging service (SMS) system.

A communication may be received step 26. For example, signaling to establish a voice call session may be received at step 26, a text message may be received at step 26, or both signaling to establish a voice call session and a text message may be received at step 26.

It may be determined, at step 32 if the received communication is a text message, signaling to establish a voice call session, or both a text message and signaling to establish a voice call session. If the received communication is a text message, communication may be conducted with the mobile device via text messaging, at step 34. If the received communication is signaling to establish a voice call session, communication may be conducted with the mobile device via voice, at step 36. If the received communication comprises signaling to establish a voice call session and a text message, communication may be conducted with the mobile device via voice, at step 38. Optionally, communication may be conducted with the mobile device via voice and text at step 38.

Communications may be conducted between the mobile device and an appropriate entity, such as, for example, a public safety answering point (PSAP), a police station, a fire department, an ambulance service, a relative, etc. In an example embodiment, if the voice called is dropped, lost, or becomes intermittent (step 40), the communication may be switched over to a text communication (step 34). In an example embodiment, a PSAP may have the ability to launch a text message to the mobile device, which may be activated after trying to re-establish a voice call. To achieve this, the PSAP may initiate a message in a Session Initiation Protocol (SIP) session for example. The Next-Generation Emergency Services IP-Network (ESI-Net) Selective Router may retain information related to which Text Gateway server the original text message was forwarded from. The session may then be established through that Gateway to the wireless network and the calling party. If the call is not dropped, not lost, or does not become intermittent (step 32), the call may continue to be monitored as depicted at step 40.

Figure 2:
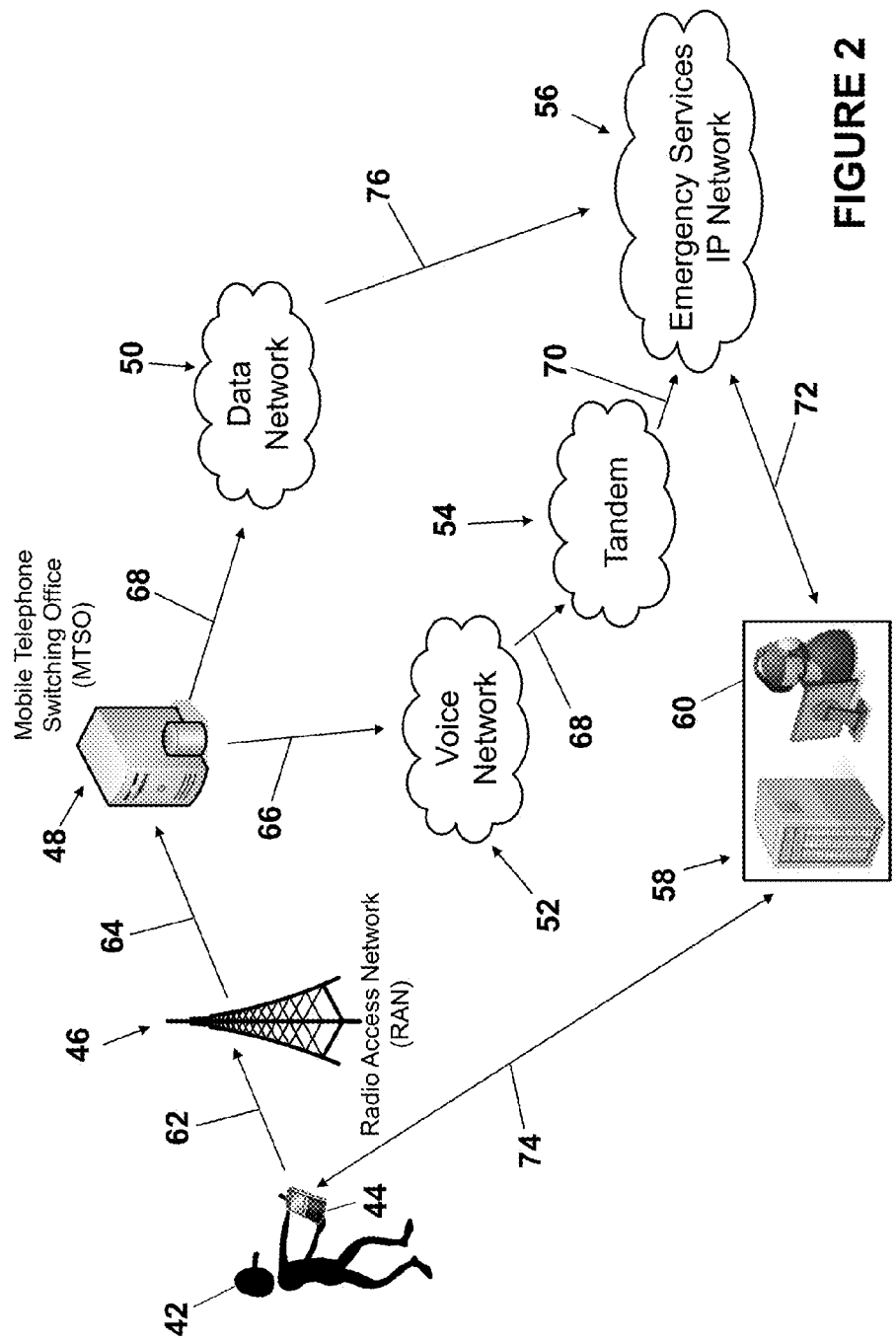
FIG. 2 illustrates an example system and process for text message generation for emergency services as a backup to voice communications.

FIG. 2 illustrates an example system and process for text message generation for emergency services as a backup to voice communications. As depicted in FIG. 2, a user (e.g., subscriber) 42, may initiate an emergency call, for example (e.g., to 9-1-1, to hospital, to police, to fire department, to relative, to designated number, etc.). An emergency call may include any appropriate emergency call as described herein. The user 42 may initiate the call via a mobile device 44, to a mobile telephone switching office 48, via a wireless network 46, at steps 62 and 64. The call can be in the form of any appropriate call as described herein. The call may be, for example, a call for emergency services, a 9-1-1 call, a call to a relative, or any appropriate call. The mobile device 44 may generate a text message. In an example embodiment, the text message may be automatically generated by the mobile device 44. The text message may be automatically generated when the call is initiated. In an example embodiment, the text message may be automatically generated when it is determined that the call is of a predetermined type or class, such as, for example, an emergency call. An emergency call may comprise a 9-1-1 call (e.g., called number is 9-1-1), a call to a predetermined number, a call to a number that is determined to be related to an emergency call, or the like, or any appropriate combination thereof. Predetermined numbers may comprise, for example, a list of predetermined phone numbers such as a phone number of a fire department, a phone number of an ambulance, a phone number of a police station, a phone number of a hospital, a phone number of a relative (e.g., parent, child, etc.), or the like. In an example embodiment, when the call is initiated, the list of predetermined numbers may be compared to the number being called, and if a match exists, it may be determined that the call is an emergency call.

In an example embodiment, when the call is initiated, the number being called may be used to query a database, a search engine, memory (e.g., on the device 44), or the like to determine if the number is associated with an emergency call. For example, the number may be used to search a directory to determine to whom the number is assigned. If the number is assigned to a hospital, a police station, an ambulance service, etc., the call may be determined to be an emergency call.

The text message may comprise any appropriate message. The text message may comprise a short messaging service (SMS) message. The text message may be predetermined, generated dynamically when the call is initiated, or any appropriate combination thereof. For example, the text message may comprise a predetermined message such as, for example, "Help," "Need Assistance," etc. The predetermined text message may include the name of the person sending the message. The name of the person may be obtained, for example, from profile information stored on a mobile device 44, the mobile device 44 may be programmed to store a subscriber's name, for incorporation into the text message, or any appropriate combination thereof. Accordingly, the predetermined message may comprise a message such as, for example, "Help, my name is Joe Smith," "Need Assistance, my name is Joe Smith" etc.

The text message may comprise information that is determined dynamically as triggered by initiation of the call. For example, the text message may comprise location information, time, etc. In an example embodiment, the text message may comprise a current location of the mobile device 44, the most recent known location of the mobile device 44, or the like, or any appropriate combination thereof. The text message may comprise a time at which the text message is being generated. Location information may be formatted in any appropriate manner, such as, for example, latitude, longitude, map coordinates, addresses, etc. In an example embodiment, location information may be formatted in accordance with geographic code references such as the Federal Information Processing Standard (FIPS), ZIP codes, and/or the National Weather Service Specific Area Message Encoder (SAME) codes, Geographic Information System (GIS) Alert Mapping Service, or the like, or any appropriate combination thereof.

In an example embodiment, when the call is initiated, a prompt may be rendered on the mobile device 44. The prompt may be provided in any appropriate manner, such as, for example, visually, audibly, mechanically (e.g., vibration), or the like, or any appropriate combination thereof. The prompt may indicate that a user 42 of the mobile device 44 should speak, for example, into the device. The prompt may indicate that the user 42 should speak his/her name, location, and/or nature of the emergency. For example, upon determining, by the mobile device 44, that the call is an emergency call, a message may be displayed on the mobile device 44 indicating that the user 42 should say his/her name, location, and nature of the emergency. The audio information spoken by the user 42 may be converted into text. The converted text may be incorporated into the text message.

The text message and/or signaling to establish a voice call session may be provided to the mobile telephone switching office (MTSO) 48 via the radio access network (RAN) 46, at steps 62 and 64. As described in more detail herein, the MTSO 48 may comprise systems, such as a Mobile Switching Center (MSC), for routing phone calls, connectivity to local and long distance networks, billing, and the like. The MTSO 48 may mark the text messaging session and the voice call session as having commonality. The MTSO 48 may mark or tag the text messaging session and the voice call session in any appropriate manner. For example, information in each of the text messaging session and the voice call session may be formatted to include an indication of the mobile device 44 (e.g., international mobile subscriber identity, IMSI, a mobile subscriber integrated services digital network number, MSISDN, etc.), an indication of a subscriber 42 associated with the mobile device 44, an identification number indicated that the text messaging session and the voice call session are correlated or paired, or the like, or any appropriate combination thereof.

In an example embodiment, the MTSO 48 may determine if conditions are sufficient to establish and/or maintain a voice call. Conditions, or factors, to be considered may include signal strength, battery power of the mobile device, propagation characteristics, obstructions, or the like, or any appropriate combination thereof. In an example embodiment, signal strength (e.g., power, voltage, current, etc.) of a signal received by the mobile device may be analyzed. If it is determined that the received signal strength is less than a threshold value, it may be determined that conditions are not sufficient to establish and/or maintain a voice call session. If it is determined that the received signal strength is equal to or greater than a threshold value, it may be determined that conditions are sufficient to establish and/or maintain a voice call session. The threshold value may comprise any appropriate value, such as, for example, a value of power, a value of voltage, a value of current, a percentage value of power, a percentage value of voltage, a percentage value of current, or the like, or any appropriate combination thereof.

If the MTSO 48 determines that conditions are not sufficient to establish and/or maintain a voice call session, the MTSO 48 may determine if conditions are sufficient for text messaging. Conditions, or factors, to be considered may include signal strength, battery power of the mobile device, propagation characteristics, obstructions, or the like, or any appropriate combination thereof. In an example embodiment, signal strength (e.g., power, voltage, current, etc.) of a signal received by the mobile device may be analyzed. If it is determined that the received signal strength is less than a threshold value, it may be determined that conditions are not sufficient to establish and/or maintain a text call session. If it is determined that the received signal strength is equal to or greater than a threshold value, it may be determined that conditions are sufficient to establish and/or maintain a text call session. The threshold value may comprise any appropriate value, such as, for example, a value of power, a value of voltage, a value of current, a percentage value of power, a percentage value of voltage, a percentage value of current, or the like, or any appropriate combination thereof.

If the MTSO 48 determines that conditions are not sufficient to establish and/or maintain a text messaging session and the conditions are not sufficient to establish and/or maintain a voice session, the MTSO 48 try again. If the MTSO 48 determines that conditions are sufficient to establish and/or maintain a voice call session, the voice call may be forwarded to the voice network 52 and step 66. Optionally, if the MTSO 48 determines that conditions are sufficient to establish and/or maintain a voice call session, the voice call and the text message may be forwarded. The voice call may be forwarded to the voice network 52 and step 66 and the text message may be forwarded to the data network 50 at step 68. The voice network 52 and the data network 50 may comprise any appropriate network. For example, the voice network 52 may comprise any appropriate network capable of communicating voice. The data network 50 may comprise any appropriate network capable of communicating data, text, or any appropriate combination thereof. In an example embodiment, the data network 50 may comprise text a network capable of communications via the short messaging service (SMS) system.

In an example embodiment, a voice call may originate in the Wireless Network. The voice call may traverse the wireless network to an egress point (e.g., Long Distance TDM network, Local TDM Network with Legacy Selective router, directly terminate on the Emergency Services IP network, etc.). The Short Message Service (SMS) is a text messaging service component of phone, web, or mobile communication system that may use communications protocols that may allow the exchange of text messages between fixed line and/or mobile devices. Mobile-to-mobile SMS text messages may be delivered using the Short Message Peer-to-Peer (SMPP) protocol over an IP network. SMS may be available on networks such as, for example, GSM, 3G, 4G, etc. Not all text messages necessarily need to use the SMS. A text message may egress through the Short Message Service Center (SMSC) platform in the wireless network, through a Text Gateway Server, to the Emergency Services IP network. The gateway server may perform the conversion from SMPP to SIP.

If the MTSO 48 determines that conditions are sufficient to establish and/or maintain a voice call session, the voice call may be forwarded to the voice network 52 at step 66. Optionally, if the MTSO 48 determines that conditions are sufficient to establish and/or maintain a voice call session, the voice call and the text message may be forwarded at steps 66 and 68. The voice call may be forwarded via voice network 52 and the text message may be forwarded via data network 50. As described above, the MTSO may mark the voice call and the corresponding text (e.g., SMS) message as having commonality, originating from the same source, etc. and forward them to the appropriate destination via separate paths. Thus, when the two communications (e.g., voice and text) are received, the PSAP 58 for example, equipment at the PSAP 58 may be able to determine that the two communications are correlated (have commonality) and process them accordingly. This may be based on a Pseudo-ANI and Calling Party Number. The MTSO may generate the Pseudo-ANI, which is associated with the cell tower serving the calling party, to determine the appropriate Service Provider to which the voice call may be forwarded. The Calling Party Number may identify the device. As the text message is forwarded to an SMS gateway, the Emergency Call Routing Function (ECRF) may be accessed to perform a LoST (Location to Service Translation) function to determine an appropriate ESI-Net based on the calling party's location information. The intelligence in the Emergency Services IP Network Selective Router (providing call routing and call control) may correlate the voice and text components and deliver the appropriate information to the 9-1-1 agent at the PSAP. The protocol used in the ESI-Net would be SIP.

The voice path may comprise trunking to the voice network 52, which may comprise, for example, a local and/or long distance voice network. In an example embodiment, signaling associated with the voice call may be carried over the data network 50, which may comprise, for example, a SS7 data network, or the like. In an example embodiment, the voice call may be established using SS7 signaling and the Pseudo-ANI and Calling Party Number and other parameters may be available to identify the caller. These parameters may be interworked into the SIP protocol by a TDM/IP gateway of the ESI-Net.

The text message (e.g., SMS text message) also may utilize the data network 50 (e.g., telephony SS7 signaling network) for transport and may be interleaved with voice signaling traffic. In an example embodiment, voice calls may be forwarded to the emergency services IP network 56 via a tandem office 54 at steps 68 and 70. The tandem office 54 may comprise any appropriate entity capable of providing communications between the voice network 52 and the emergency services IP network 56. An E 9-1-1 legacy selective router may comprise software that resides on a tandem switching element within a legacy TDM network that may receive 9-1-1 calls originated with the Public Telephone Network, may route the call to the appropriate PSAP, and may provide the signaling interface to the PSAP itself. If there is not a direct voice link from the MTSO to the PSAP, the legacy selective router tandem may provide the switching to establish the path. Over time, the selective router function may be absorbed into the IP based selective router in the ESI-Net. The legacy tandem selective router and the ESI-Net selective router may co-exist in the network.

If the MTSO 48 determines that conditions are sufficient to establish and/or maintain a text messaging session, but not sufficient to establish and/or maintain a voice session, the text message may be forwarded to the data network 50 at step 68. The text message may be forwarded to the emergency services IP network 56 from the MTSO 48, via the data network 50, at steps 68 and 76.

The emergency services IP network 56 may comprise, for example, any appropriate entity capable of receiving voice and text communications and communicating (step 72) with a PSAP 58. In an example embodiment, the emergency services IP network 56 may comprise circuitry that provides communication between the data network 50 and the PSAP 58. The emergency services IP network 56 also may comprise circuitry that provides communication between the voice network 52 (optionally via the tandem office 54) and the PSAP 58. In an example embodiment, the emergency services IP network 56 may comprise a time division multiplexing (TDM) to IP gateway that provides communication between the signaling system number 7 (SS7) and the session initiation protocol (SIP) for signaling and real-time transport (RTP) for packetized voice, a selective router for routing the voice and text information to the appropriate Public Safety Answering Point (PSAP) 58, and a session border controller (SBC) to exert control over signaling and media paths and security between the service provider network and the government network supporting the PSAP infrastructure 58. In an example embodiment, a TDM/IP Gateway comprises a gateway between a legacy TDM network and a Next-Generation 9-1-1 Emergency Services IP Network that interworks legacy TDM signaling such as SS7 ISUP or MF CAMA (Centralized Automatic Message Accounting) with SIP (Session Initiation Protocol) signaling. In an example embodiment, a Next-Generation ESInet Selective Routing comprises a function in the Next Gen ESInet that may selectively route 9-1-1 calls to PSAPs. In addition to wireline and wireless calls, the ESInet selective routing function may also receive and process native VoIP calls as well as text, video, picture and future technologies. In an example embodiment, a Session Border Controller (SBC) may comprise a functional element that may provide security, NAT (Network Address Translation) traversal, protocol repair, and other functions to VoIP signaling such as SIP, for example. SBC may be a component of a Border Control Function.

In an example embodiment, the selective router of the emergency services IP network 56 may correlate the voice call and the text message that have commonality and forward both (the voice call and the text message) to the same agent 60 in the PSAP 58. The selective router may continue to coordinate with an automatic call distribution (ACD) function of the PSAP 58 to assure that subsequent text messages are delivered to the same agent 60 for continuity.

If the communication received by equipment of the PSAP 58 is a text message only, communication may be established/maintained between equipment of the PSAP 58 and the mobile device 44 via text at step 74. If the communication received by equipment of the PSAP 58 is a voice only, communication may be established/maintained between equipment of the PSAP 58 and the mobile device 44 via voice at step 74. If the communication received by equipment of the PSAP 58 is a voice and text, communication may be established/maintained between equipment of the PSAP 58 and the mobile device 44 via voice at step 74 and optionally via text.

In an example embodiment, if the voice call between equipment at the PSAP 58 and the mobile device 44 is dropped, lost, or becomes intermittent, the communication may be switched over to a text communication. For example, after trying to establish a voice call, the PSAP may launch a text message in an attempt to reconnect with the mobile device. The PSAP may communicate its request to the ESI-Net Selective Router, which may retain incoming text messages for a specified period of time. After retrieving the associated record, the ESI-Net selective router may attempt to re-establish the connection through the originating SMS Gateway.

Figure 3:
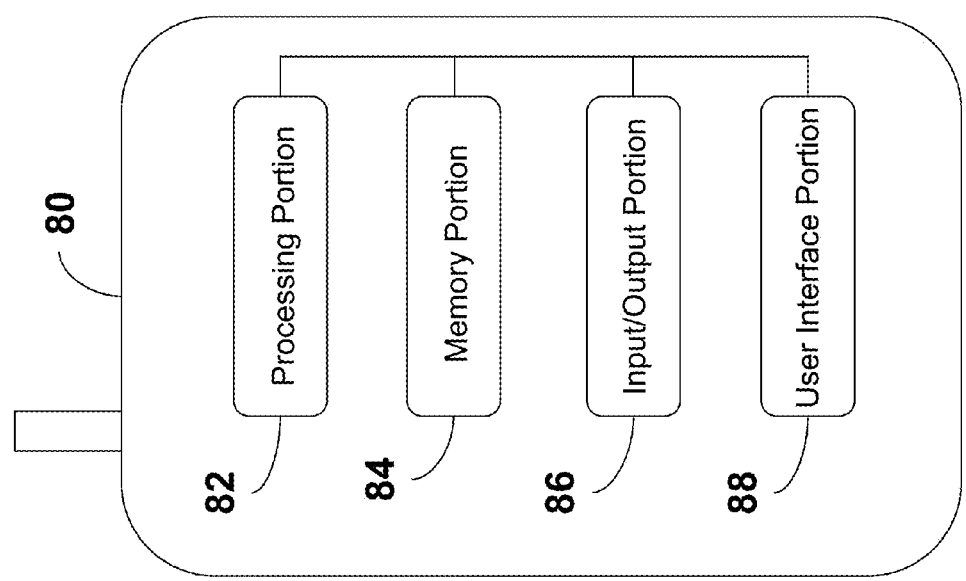
FIG. 3 is a block diagram of an example communications device configured to facilitate text message generation for emergency services as a backup to voice communications.

FIG. 3 is a block diagram of an example communications device 80 configured to facilitate text message generation for emergency services as a backup to voice communications. In an example embodiment, the communications device 80 may comprise the mobile device 44. In an example configuration, communications device 80 comprises a mobile wireless device. The communications device 80, however, may comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The communications device 80 can include devices that are not typically thought of as portable, such as, for example, a public computing device, a navigation device installed in-vehicle, a set top box, or the like. The mobile communications device 80 can include non-conventional computing devices, such as, for example, a kitchen appliance, a motor vehicle control (e.g., steering wheel), etc., or the like. As evident from the herein description a communications device, a mobile device, or any portion thereof is not to be construed as software per se.

The communications device 80 may include any appropriate device, mechanism, software, and/or hardware for facilitating text message generation for emergency services as a backup to voice communications as described herein. In an example embodiment, the ability to facilitate text message generation for emergency services as a backup to voice communications is a feature of the communications device 80 that can be turned on and off. Thus, in an example embodiment, an owner of the communications device 80 may opt-in or opt-out of this capability.

In an example embodiment, the communications device 80 comprises a processor and memory coupled to the processor. The memory may comprise executable instructions that when executed by the processor cause the processor to effectuate operations associated with text message generation for emergency services as a backup to voice communications.

In an example configuration, the communications device 80 comprises a processing portion 82, a memory portion 84, an input/output portion 86, and a user interface (UI) portion 88. Each portion of the communications device 80 comprises circuitry for performing functions associated with each respective portion. Thus, each portion can comprise hardware, or a combination of hardware and software. Accordingly, each portion of the communications device 80 is not to be construed as software per se. It is emphasized that the block diagram depiction of communications device 80 is exemplary and not intended to imply a specific implementation and/or configuration. For example, in an example configuration, the communications device 80 may comprise a cellular phone and the processing portion 82 and/or the memory portion 84 may be implemented, in part or in total, on a subscriber identity module (SIM) of the mobile communications device 80. In another example configuration, the communications device 80 may comprise a laptop computer. The laptop computer can include a SIM, and various portions of the processing portion 82 and/or the memory portion 84 can be implemented on the SIM, on the laptop other than the SIM, or any combination thereof.

The processing portion 82, memory portion 84, and input/output portion 86 are coupled together to allow communications therebetween. In various embodiments, the input/output portion 86 comprises a receiver of the communications device 80, a transmitter of the communications device 80, or a combination thereof. The input/output portion 86 is capable of receiving and/or providing information pertaining to text message generation for emergency services as a backup to voice communications as described herein. In various configurations, the input/output portion 86 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 82 may be capable of performing functions pertaining to text message generation for emergency services as a backup to voice communications as described herein. In a basic configuration, the communications device 80 may include at least one memory portion 84. The memory portion 84 may comprise a storage medium having a tangible physical structure. Thus, the memory portion 84, as well as any computer-readable storage medium described herein, is not to be construed as a transient signal per se. Further, the memory portion 84, as well as any computer-readable storage medium described herein, is not to be construed as a propagating signal per se. The memory portion 84 may store any information utilized in conjunction with the text message generation for emergency services as a backup to voice communications as described herein. Depending upon the exact configuration and type of processor, the memory portion 84 may be volatile (such as some types of RAM), non-volatile (such as ROM, flash memory, etc.), or a combination thereof. The mobile communications device 80 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 80.

The communications device 80 also may contain a user interface (UI) portion 88 allowing a user to communicate with the communications device 80. The UI portion 88 may be capable of rendering any information utilized in conjunction with text message generation for emergency services as a backup to voice communications as described herein. The UI portion 88 may provide the ability to control the communications device 80, via, for example, buttons, soft keys, voice actuated controls, a touch screen, movement of the mobile communications device 80, visual cues (e.g., moving a hand in front of a camera on the mobile communications device 80), or the like. The UI portion 88 may provide visual information (e.g., via a display), audio information (e.g., via speaker), mechanically (e.g., via a vibrating mechanism), or a combination thereof. In various configurations, the UI portion 88 may comprise a display, a touch screen, a keyboard, an accelerometer, a motion detector, a speaker, a microphone, a camera, a tilt sensor, or any combination thereof. The UI portion 88 may comprise means for inputting biometric information, such as, for example, fingerprint information, retinal information, voice information, and/or facial characteristic information.

The UI portion 88 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating content and/or settings, interacting with other applications, or the like, and may aid the user in inputting selections associated with text message generation for emergency services as a backup to voice communications as described herein.

Figure 4:
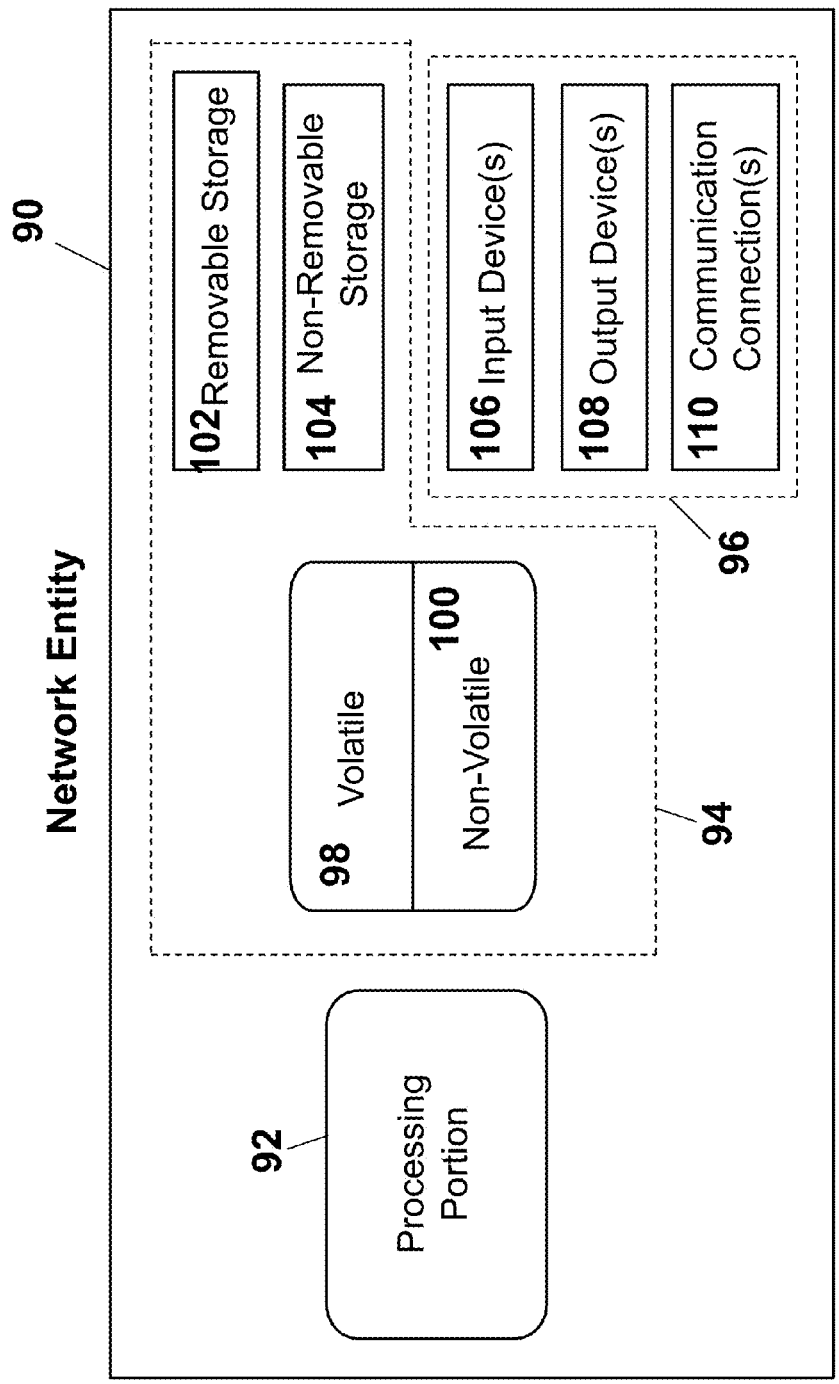
FIG. 4 is a block diagram of an example network entity for text message generation for emergency services as a backup to voice communications.

FIG. 4 is a block diagram of an example network entity 90 for text message generation for emergency services as a backup to voice communications. The network entity 90 may comprise hardware or a combination of hardware and software. When used in conjunction with a network, the functionality needed to facilitate text message generation for emergency services as a backup to voice communications can reside in any one or combination of network entities. The network entity 90 depicted in FIG. 4 represents any appropriate network entity, or combination of network entities, such as a processor, a server, a gateway, a node, any appropriate entity depicted in FIG. 5, any appropriate entity depicted in FIG. 6, any appropriate entity depicted in FIG. 7, any appropriate entity depicted in FIG. 8, the MTSO depicted in FIG. 2, any appropriate entity, component, device, and/or circuitry of the MTSO depicted in FIG. 2, any appropriate entity, component, device, and/or circuitry of the voice network depicted in FIG. 2, any appropriate entity, component, device, and/or circuitry of the data network depicted in FIG. 2, any appropriate entity, component, device, and/or circuitry of the tandem office depicted in FIG. 2, any appropriate entity, component, device, and/or circuitry of the emergency services IP network depicted in FIG. 2, any appropriate entity, component, device, and/or circuitry of the PSAP depicted in FIG. 2, or any appropriate combination thereof. In an example configuration, the network entity 90 comprises a component or various components of a cellular broadcast system wireless network. It is emphasized that the block diagram depicted in FIG. 4 is exemplary and not intended to imply a specific implementation or configuration. Thus, the network entity 90 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example embodiment, the network entity 90 comprises a processor and memory coupled to the processor. The memory may comprise executable instructions that when executed by the processor cause the processor to effectuate operations associated with text message generation for emergency services as a backup to voice communications. As evident from the herein description a network entity or any portion thereof is not to be construed as software per se.

In an example embodiment, the network entity 90 comprises a processor and memory coupled to the processor. The memory may comprise executable instructions that when executed by the processor cause the processor to effectuate operations associated with text message generation for emergency services as a backup to voice communications.

In an example configuration, the network entity 90 comprises a processing portion 92, a memory portion 94, and an input/output portion 96. The processing portion 92, memory portion 94, and input/output portion 96 are coupled together (coupling not shown in FIG. 4) to allow communications therebetween. The input/output portion 96 may be capable of receiving and/or providing information from/to a communications device and/or other network entities configured to be utilized with text message generation for emergency services as a backup to voice communications. For example, the input/output portion 96 may include a wireless communications (e.g., 2.5G/3G/4G/GPS) card. The input/output portion 96 may be capable of receiving and/or sending video information, audio information, control information, image information, data, or any combination thereof. In an example embodiment, the input/output portion 36 may be capable of receiving and/or sending information to determine a location of the network entity 90 and/or the communications device 30. In an example configuration, the input\output portion 96 may comprise a GPS receiver. In an example configuration, the network entity 90 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 96 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 92 may be capable of performing functions associated with text message generation for emergency services as a backup to voice communications as described herein. That is, a communications device can perform functions internally (by the device) and/or utilize the network entity 90 to perform functions. For example, the processing portion 92 may be capable of, in conjunction with any other portion of the network entity 90, installing an application for text message generation for emergency services as a backup to voice communications, processing an application for text message generation for emergency services as a backup to voice communications, configuring the network entity 90 to function as a gateway for other devices to a network, determining the location at which to provide text message generation for emergency services as a backup to voice communications, determining the duration during which to provide text message generation for emergency services as a backup to voice communications, or the like, or any combination thereof. The processing portion 92, in conjunction with any other portion of the network entity 90, enables the network entity 90 to covert speech to text when it is configured to also send text messages while utilizing the event based service.

In a basic configuration, the network entity 90 may include at least one memory portion 94. The memory portion 94 may comprise a storage medium having a tangible physical structure. Thus, the memory portion 94, as well as any computer-readable storage medium described herein, is not to be construed as a transient signal per se. The memory portion 94, as well as any computer-readable storage medium described herein, is not to be construed as a propagating signal per se. The memory portion 94 may store any information utilized in conjunction with text message generation for emergency services as a backup to voice communications as described herein. Depending upon the exact configuration and type of processor, the memory portion 94 may be volatile 98 (such as some types of RAM), non-volatile 100 (such as ROM, flash memory, etc.), or a combination thereof. The network entity 90 may include additional storage (e.g., removable storage 102 and/or non-removable storage 104) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 90.

The network entity 90 also may contain communications connection(s) 110 that allow the network entity 90 to communicate with other devices, network entities, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The network entity 90 also can include input device(s) 106 such as keyboard, mouse, pen, voice input device, touch input device, etc. Output device(s) 108 such as a display, speakers, printer, etc. also can be included.

A communications device and/or network entity may be part of and/or in communications with various wireless communications networks. Some of which are described below.

Figure 5:
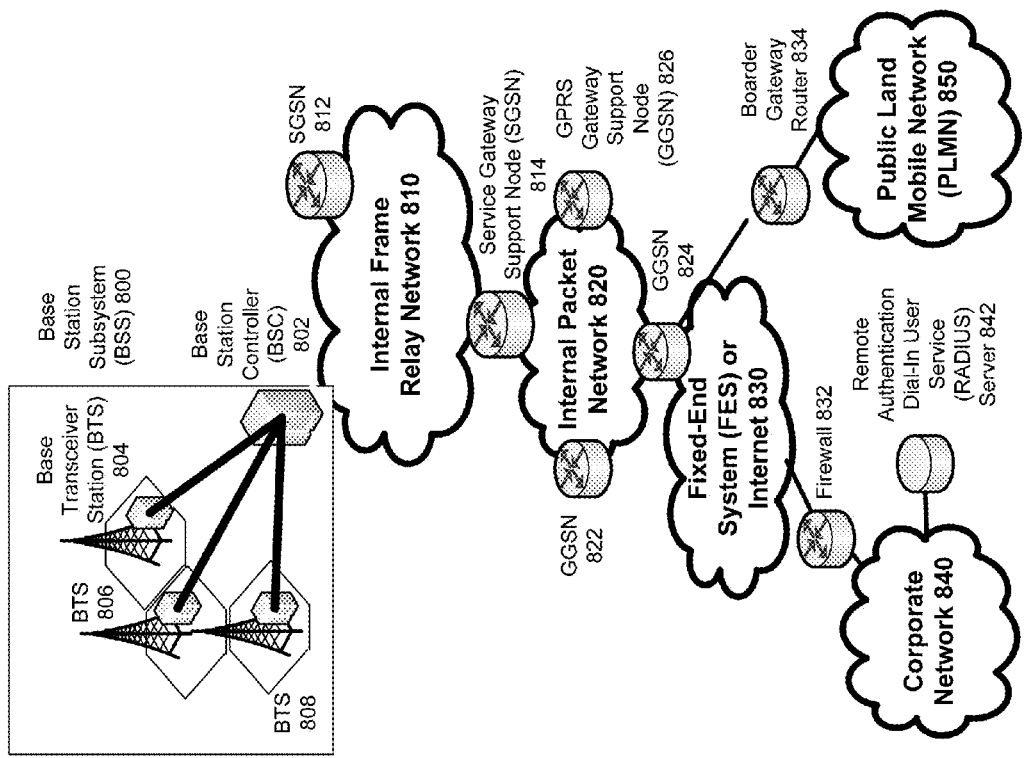
FIG. 5 depicts an overall block diagram of an example packet-based mobile cellular network environment, such as a GPRS network, within which text message generation for emergency services as a backup to voice communications may be implemented.

FIG. 5 depicts an overall block diagram of an example packet-based mobile cellular network environment, such as a GPRS network, within which text message generation for emergency services as a backup to voice communications may be implemented. In the example packet-based mobile cellular network environment shown in FIG. 5, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
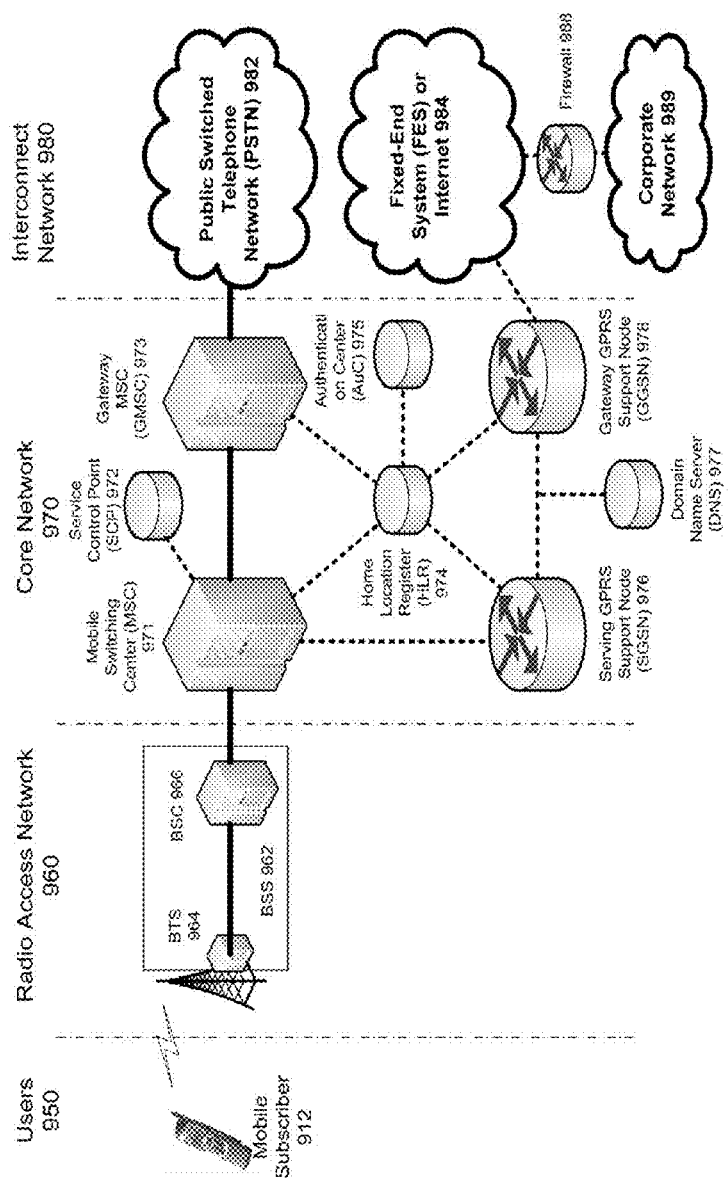
FIG. 6 illustrates an architecture of a typical GPRS network within which text message generation for emergency services as a backup to voice communications can be implemented.

FIG. 6 illustrates an architecture of a typical GPRS network within which text message generation for emergency services as a backup to voice communications can be implemented. The architecture depicted in FIG. 6 is segmented into four groups: users 950, radio access network 960, core network 970, and interconnect network 980. Users 950 comprise a plurality of end users. Note, device 912 is referred to as a mobile subscriber in the description of network shown in FIG. 6. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 6, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 6, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972.

The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 7:
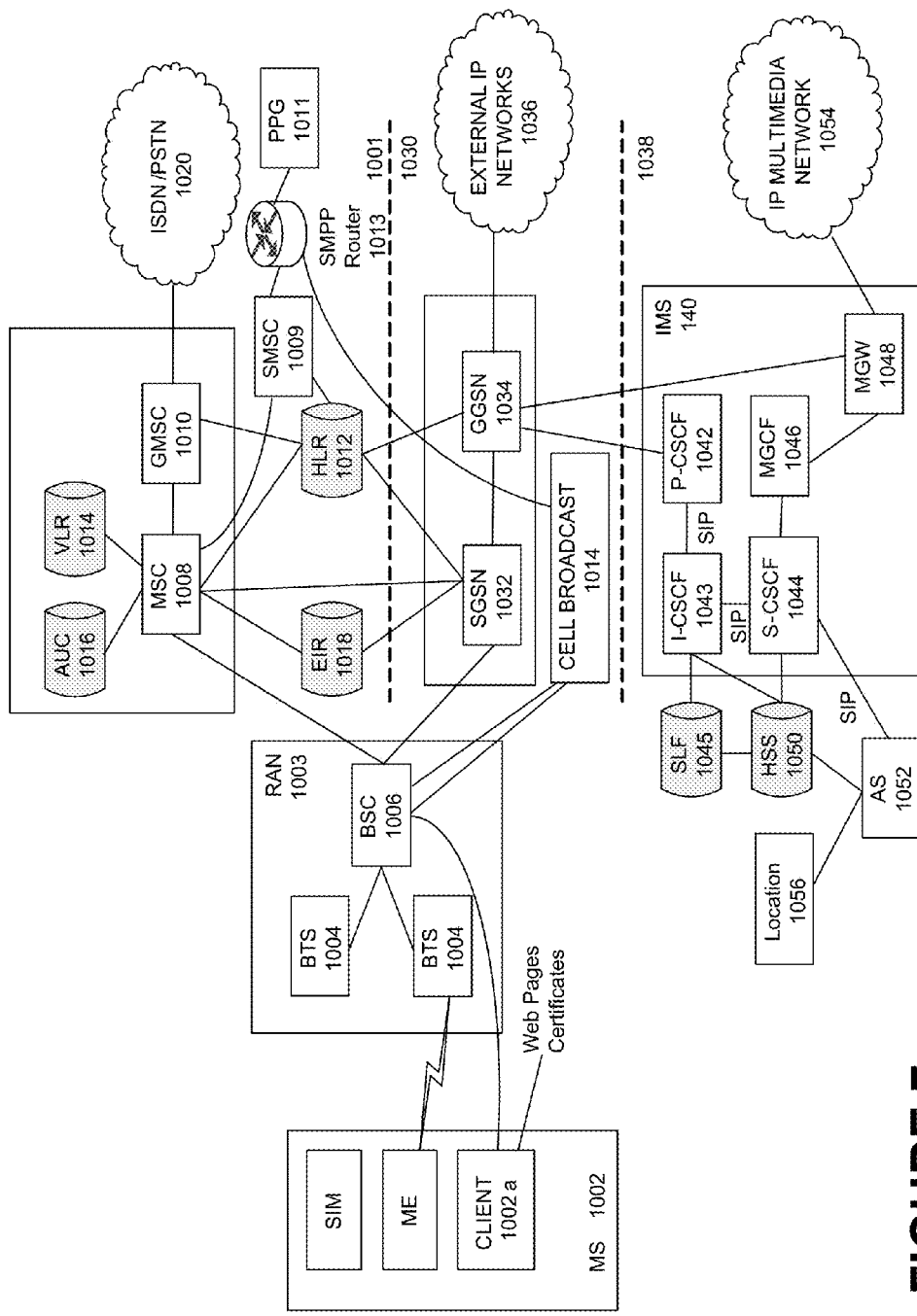
FIG. 7 illustrates an example block diagram view of a GSM/GPRS/IP multimedia network architecture within which text message generation for emergency services as a backup to voice communications may be implemented.

FIG. 7 illustrates an example block diagram view of a GSM/GPRS/IP multimedia network architecture within which text message generation for emergency services as a backup to voice communications may be implemented. As illustrated, the architecture of FIG. 7 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1014 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 8:
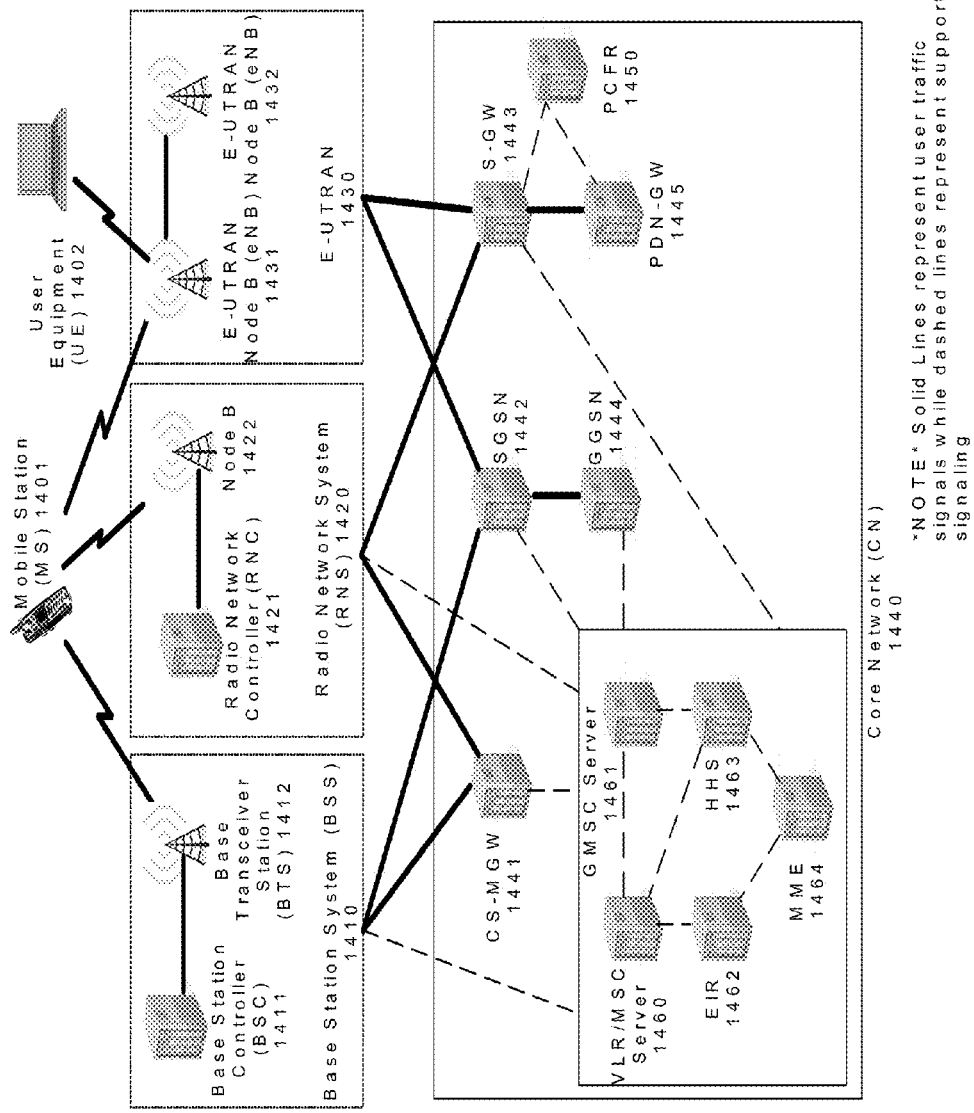
FIG. 8 illustrates a PLMN block diagram view of an example architecture in which text message generation for emergency services as a backup to voice communications may be incorporated.

FIG. 8 illustrates a PLMN block diagram view of an example architecture in which text message generation for emergency services as a backup to voice communications may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of text message generation for emergency services as a backup to voice communications have been described in connection with various computing devices/processors, the underlying concepts may be applied to any computing device, processor, or system capable of implementing text message generation for emergency services as a backup to voice communications. The various techniques described herein can be implemented in connection with hardware or software or, where appropriate, with a combination of both. Thus, the methods and apparatuses of using and implementing text message generation for emergency services as a backup to voice communications may be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. When the program code is loaded into and executed by a machine, such as a computer, the machine becomes an apparatus for implementing text message generation for emergency services as a backup to voice communications. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for using and implementing text message generation for emergency services as a backup to voice communications also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing text message generation for emergency services as a backup to voice communications. When implemented on a general-purpose processor, the program code combines with the processor to provide a unique apparatus that operates to invoke the functionality of text message generation for emergency services as a backup to voice communications.

While text message generation for emergency services as a backup to voice communications has been described in connection with the various embodiments of the various figures, it is to be understood that other similar embodiments can be used or modifications and additions can be made to the described embodiments for implementing text message generation for emergency services as a backup to voice communications without deviating therefrom. For example, one skilled in the art will recognize that text message generation for emergency services as a backup to voice communications as described in the present application may apply to any environment, whether wired or wireless, and may be applied to any number of such devices connected via a communications network and interacting across the network. Therefore, text message generation for emergency services as a backup to voice communications should not be limited to any single embodiment, but rather should be construed in breadth and scope in accordance with the appended claims.

What is claimed:

1. A method comprising:
receiving an indication of an emergency voice call;
receiving an indication of an emergency text message;
generating an identifier indicating that the emergency voice call and the emergency text message are correlated based on the emergency voice call and the emergency text message being generated by a common source, the identifier comprising:
an indication of the common source; and
a correlation number;
generating first signaling comprising the indication of the emergency voice call and the identifier;
generating second signaling comprising the indication of the emergency text message and the identifier;
providing the first signaling via a first communication network; and
providing the second signaling via a second communication network.

2. The method of claim 1, wherein:
the first network differs from the second network.

3. The method of claim 1, wherein:
the first network comprises circuitry for communicating a voice call; and
the second network comprises circuitry for communicating data.

4. The method of claim 1, wherein:
the indication of the emergency text message is indicative of being automatically generated upon dialing a number for the emergency voice call.

5. The method of claim 1, wherein:
the second signaling comprises a data packet comprising the identifier.

6. The method of claim 1, wherein:
the second signaling comprises a IP data packet comprising the identifier in a header of the IP data packet.

7. The method of claim 1, wherein:
an intended recipient of the emergency voice call is a public services answering position.

8. The method of claim 1, wherein:
the emergency text message comprises a an indication of sender of the emergency text message.

9. The method of claim 1, wherein:
the emergency text message comprises a an indication of a location of a device from which the emergency text message was sent.

10. The method of claim 1, wherein:
the emergency text message comprises a text message resulting from a voice to text conversion.

11. A method comprising:
receiving an indication of a voice call;
determining that the voice call is an emergency voice call;
upon determining that the voice call is an emergency voice call, automatically generating an emergency text message;
generating an identifier indicating that the emergency voice call and the emergency text message are correlated based on the emergency voice call and the emergency text message being generated by a common source, the identifier comprising:
an indication of the common source; and
a correlation number;
generating first signaling comprising the indication of the emergency voice call and the identifier;
generating second signaling comprising the indication of the emergency text message and the identifier;
providing the first signaling via a first communication network; and
providing the second signaling via a second communication network.

12. The method of claim 11, wherein:
the indication of the initiation of the emergency voice call comprised dialed digits.

13. The method of claim 11, wherein:
the indication of the initiation of the emergency voice call comprised dialed digits comprising numbers 9, 1, and 1.

14. The method of claim 11, wherein:
an intended recipient of the emergency voice call is a public services answering position.

15. The method of claim 11, wherein:
the voice call is determined to be an emergency voice call based on a number dialed being a number of a predetermined list of numbers.

16. The method of claim 11, wherein:
the emergency text message comprises a predetermined text message.

17. The method of claim 11, wherein:
the emergency text message comprises a an indication of sender of the emergency text message.

18. The method of claim 11, wherein:
the emergency text message comprises a an indication of a location of the device.

19. The method of claim 11, wherein:
the emergency text message comprises a text message resulting from a voice to text conversion.

20. A computer-readable storage medium comprising executable instruction that when executed by a processor cause the processor to effectuating operations comprising:
receiving an indication of an emergency voice call;
receiving an indication of an emergency text message;
generating an identifier indicating that the emergency voice call and the emergency text message are correlated based on the emergency voice call and the emergency text message being generated by a common source, the identifier comprising:
an indication of the common source; and
a correlation number;
generating first signaling comprising the indication of the emergency voice call and the identifier;
generating second signaling comprising the indication of the emergency text message and the identifier;
providing the first signaling via a first communication network; and
providing the second signaling via a second communication network.

* * * * *